May 22, 1928.
J. E. BODA
1,670,838
LAND TILLING IMPLEMENT
Filed Jan. 13, 1927
3 Sheets-Sheet 1
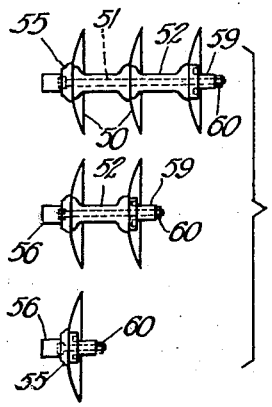
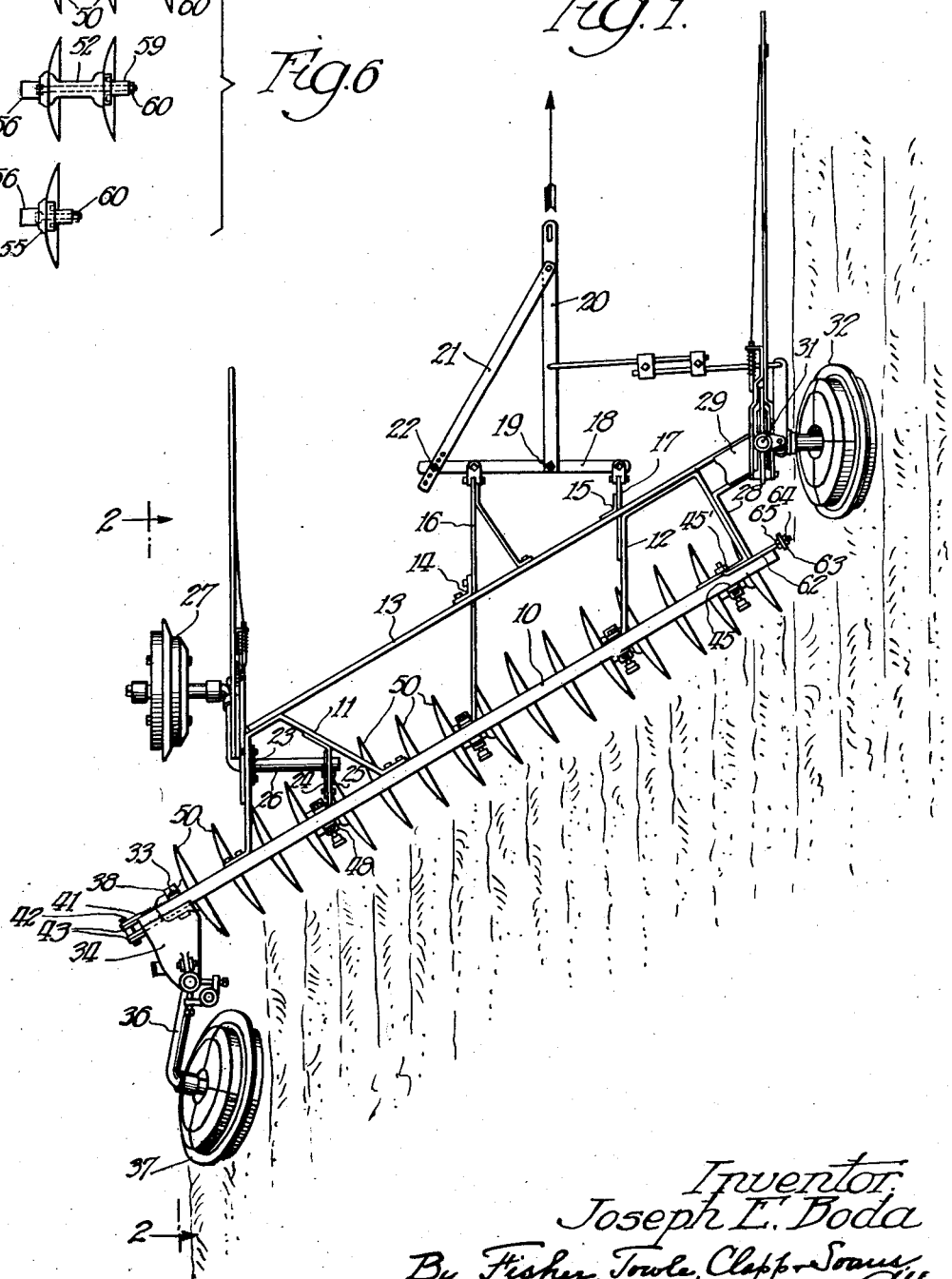
Inventor
Joseph E. Boda
By Fisher, Towle, Clapp & Soans
Attys

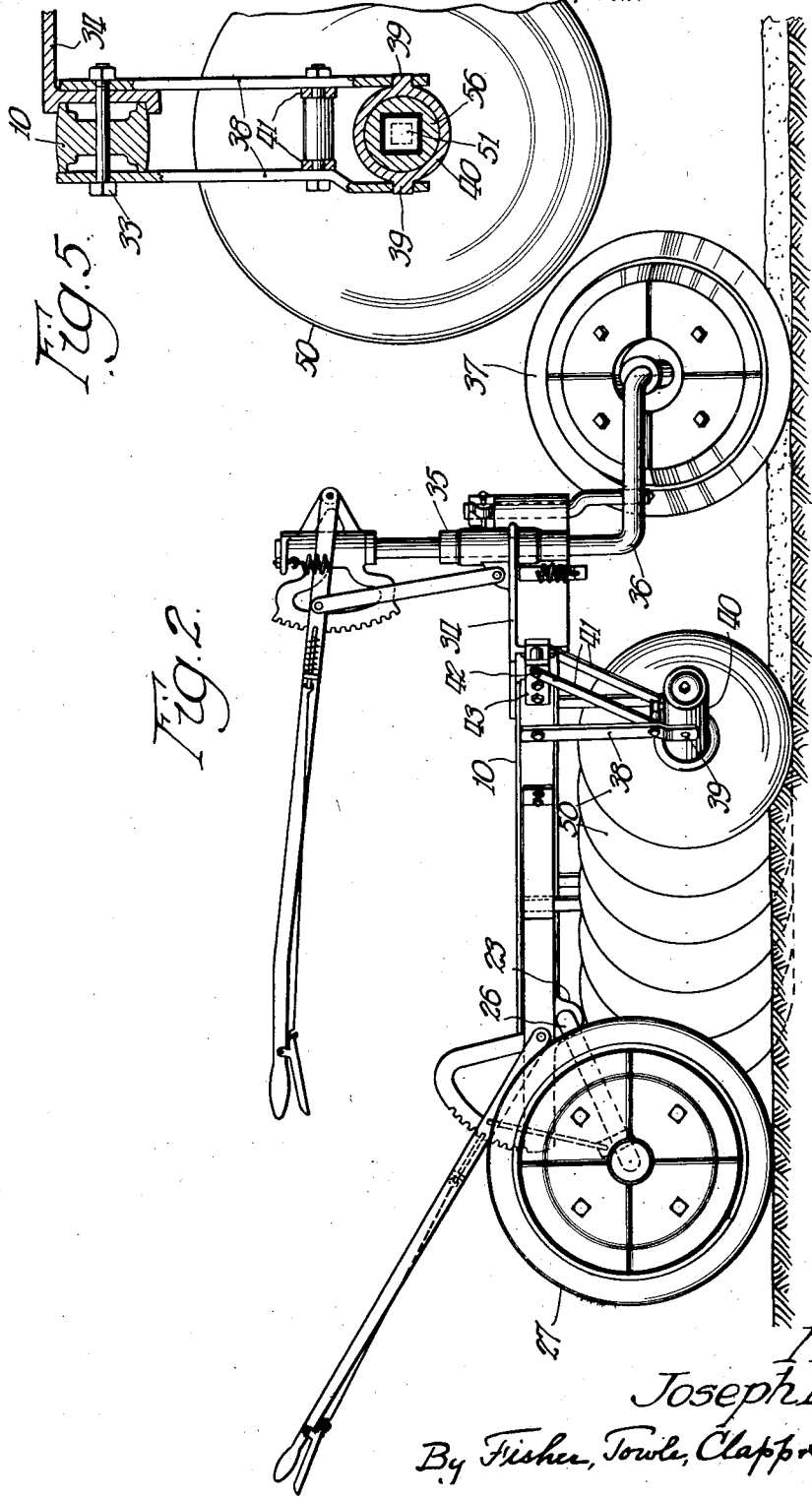

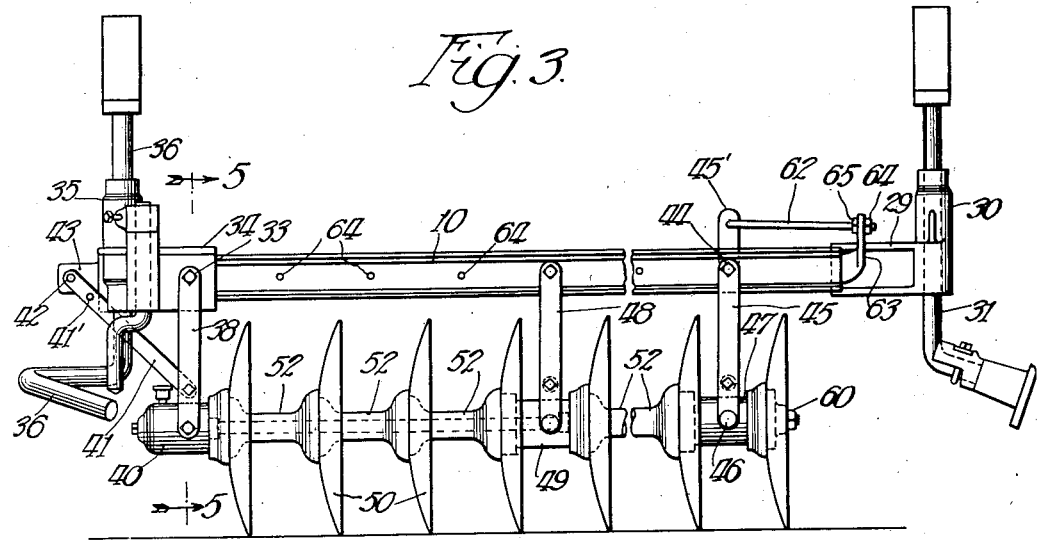
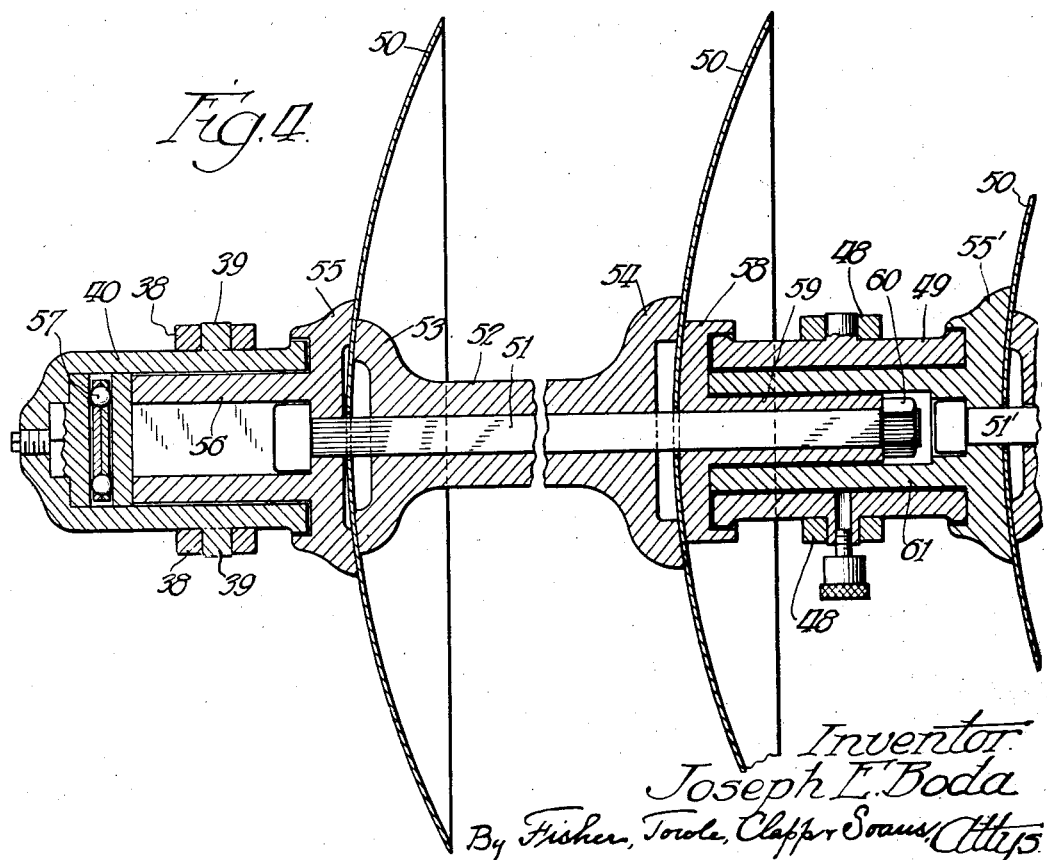

Patented May 22, 1928.

1,670,838

UNITED STATES PATENT OFFICE.

JOSEPH E. BODA, OF DIXON, ILLINOIS, ASSIGNOR TO J. I. CASE THRESHING MACHINE COMPANY, OF RACINE, WISCONSIN, A CORPORATION OF WISCONSIN.

LAND-TILLING IMPLEMENT.

Application filed January 13, 1927. Serial No. 160,801.

This invention relates to improvements in power-operated implements for land tillage, having reference more particularly to what are known as disc plows and disc harrows.

Implements of this type include a beam disposed at right angles or obliquely to the direction of travel, hanger brackets suspended from the beam equipped at their lower ends with journal bearings and thrust bearings, a shaft journaled in said bearings, and a plurality of spaced plow or harrow discs fast on the shaft. Heretofore, so far as I am aware, implements of this character have been made of a fixed and unchangeable width, so that in use they invariably plow or harrow a strip of ground of constant width.

Owing to varying conditions of soil, varying available tractor power, and other reasons, it is often desirable to narrow or widen the working capacity of the implement; and in order to avoid the necessity of maintaining in service two or more implements of varying widths, I have designed the present improvement, the main object of which is to provide in an implement of this character means whereby the working length of the plow or harrow shaft may be easily changed with an increase or decrease of the number of discs on the shaft, and without the necessity of altering the position of the draft connections, and, to accommodate the lengthening or shortening of the disc shaft, involving merely the shifting of the position of the rear furrow wheel, its journal bracket and the frame lowering and lifting lever and segment.

In order that the invention may be clearly understood, I have, in the accompanying drawings, illustrated a simple and practical embodiment of the principle of the invention; and referring thereto—

Fig. 1 is a top plan view of a well known type of disc plow equipped with my present improvement;

Fig. 2 is a side elevation of the rear portion of the plow viewed from the left of Fig. 1;

Fig. 3 is a rear elevation, broken out between its ends, and omitting the front and rear furrow wheels;

Fig. 4 is an enlarged vertical section, broken out between its ends, of the removable shaft section;

Fig. 5 is an enlarged vertical section taken on the line 5—5 of Fig. 3;

Fig. 6 is a group view, illustrating different lengths in the make up of the removable shaft sections;

The main structural features of the plow, which are old and well known, may be briefly outlined as follows. 10 designates an obliquely disposed frame bar or beam of the cross-sectional form indicated in Fig. 5, to the front face of which are bolted brackets 11 and 12 in turn connected at their forward ends by an oblique bar 13 lying parallel with the frame bar 10. To the front bar 13 are attached by brackets 14 and 15 a pair of draft bars 16 and 17 carrying at their forward ends a cross-bar 18 to which is pivoted at 19 the draft beam 20, the direction of pull being controlled by an oblique auxiliary draft bar 21 adjustably connected at 22 to one end of the cross-bar 18.

Journaled in bearings 23 and 24, the former of which is attached to the bracket 11 and the latter to a brace 25 between the other limb of the bracket 11 and the frame bar 10 is the bent axle 26 of the land wheel 27. Bolted between an extension of the bar 13 and an angle bracket 28 bolted to the outer side of the bracket 12 is a block 29 carrying the vertical journal 30 of the bent axle 31 of the front furrow wheel 32.

The frame is equipped with the usual frame raising and lowering levers and segments indicated in the drawings, but not herein specifically described as the same are old and known and are not related to the novel subject-matter of the present invention.

Slidably mounted on the outer side of the rear end portion of the frame bar 10 (Fig. 5), and attached to the latter by a through bolt 33, is a rearwardly extending bracket 34 carrying the vertical bearing 35 of a bent shaft 36 on the lower end of which is journaled the rear furrow wheel 37. Between the axle and the frame are provided the usual link and lever and segment connections, indicated in Fig. 2, by which the rear end of the frame is raised or lowered relatively to the rear furrow wheel.

Suspended from the frame bar 10 by the clamp bolt 33 are the two limbs 38 of a hanger bracket, in the lower end of which bracket is mounted by lateral pins 39 a disc shaft journal 40. This journal is braced to resist end thrust by a pair of oblique brace bars 41 bolted at their lower ends to the bracket bars 38 and at their upper ends connected by a transverse bolt 42 to an extension piece 43 secured to the rear end of the frame bar 10.

At the other end of the frame bar 10 and suspended from the latter by a bolt 44 is a depending hanger comprising a pair of bars 45 in and between the lower ends of which is carried on pivot pins 46 a journal 47.

Intermediate hanger brackets 48 (herein shown as three in number) are disposed at equally spaced intervals between the end brackets 38 and 45, and each carries at its lower end a journal 49, the detailed structure of which, as also of the end journal 47, is illustrated in the enlarged view Fig. 4.

In the end journals 40, 47, and the intermediate journals 49 is mounted the sectional disc shaft carrying fast thereon the uniformly spaced discs, the structural details of said shaft and discs preferably being as follows.

In the instance shown, the shaft carries a total of sixteen discs 50, divided into four sections each carrying four discs. Each section includes a square clamp bolt 51 extending axially through a group of spacing sleeves 52 between adjacent discs, each of said spacing discs being formed with heads 53 and 54 bearing against the concave face of one disc and the convex face of the adjacent disc. The convex face of one end disc is engaged by a clamping head 55 integral with which is a hollow trunnion 56 rotatable in the journal 40 and abutting against an anti-friction thrust bearing 57. The hollow trunnion 56 accommodates the head of the bolt 51. The concave face of the other end disc of the sectional group is engaged by a clamping head 58, integral with which is a hollow square trunnion 59 having a square bore fitting the bolt 51, and the group of discs and spacing sleeves are tightly clamped by a nut 60 bearing against the end of the trunnion 59. Surrounding the trunnion 59 is a trunnion 61 with a square bore that has a bearing in the intermediate journal 49 and is integral with a clamping head 55', the latter being centrally apertured to receive the second square clamping bolt 51'. The second, third and fourth sections of the disc shaft are identical with the first section above described. The several sections of the disc shaft are rotatably locked together by means of a tension link 62 connected at one end to a vertical extension 45' (Fig. 3) of the bracket 45 and having a threaded other end passed through a hole in a bracket 63 attached to the beam 10 and equipped with a draw nut 64 and lock nut 65.

The beam 10 is provided with a group of bolt holes 64 spaced at distances equal to the spacing of the discs 50.

Assuming that in its full length the disc shaft comprises the four sections shown, each carrying four discs, if it is desired to reduce the length of the shaft to 12 discs, the next to the rear section can be readily taken out; this being done by first removing the bolts 33 and 42 from the bracket 34 and beam extension 43, which permits the entire rear or left hand section to be shifted endwise of engagement with the trunnion 61 and bearing 49. The hanger bracket 48 is then detached from beam 10, which permits bearing 49 and the entire next shaft section to be withdrawn. The supporting bracket 34 of the rear furrow wheel with the end shaft section suspended therefrom is then slid along the beam 10 until the hole of the fastening bolt 33 registers with the hole of the fastening bolt of the hanger 48. The trunnion 59 is entered into the trunnion 61 of the third shaft section, the hanger bracket 38 is bolted at its upper end to the bracket 34 and beam 10 in the new position of said bracket, while the upper ends of the braces 41 may be bolted to the beam through the next adjacent hole 64 in the latter, said braces being provided with an extra hole 41' for this purpose. In this way, the shaft may be shortened by the elimination of one complete intermediate section; thus, in the instance shown, providing a plow with twelve discs instead of sixteen.

By the use of clamping bolts of different lengths to serve a group of three or two discs, or a single disc, as illustrated in Fig. 6, the shortening of the disc shaft by dropping out one, two, or three discs, in lieu of a complete section of four discs may be effected, by simply withdrawing the desired number of discs and spacers with the original clamp bolt, and substituting a lesser number of discs and spacers with a clamp bolt of appropriate length, and then resetting the bracket 34 to appropriate position on the beam 10 so as to support the end bearing 40 in the new position required by the shortened shaft.

I have herein illustrated and described one simple and practical embodiment of the principle of the invention which in practice has been found to satisfactorily effectuate the stated purpose or object thereof, but manifestly the structural details may be modified and changed without involving any departure from the principle of the invention or sacrificing any of the advantages thereof, and hence I reserve all such variations, modifications and mechanical equivalents as fall within the spirit and purview of the appended claims.

I claim—

1. In a tillage implement of the character described, the combination of a frame bar, spaced brackets carried by said frame bar, shaft bearings carried by said brackets, a plurality of separable shaft sections each disposed between and at its ends journaled in adjacent bearings, and discs fast on said shaft sections.

2. In a tillage implement of the character described, the combination of a frame bar, end and intermediate brackets carried by said frame bar, end and intermediate shaft bearings secured to the lower ends of said brackets, and a plurality of separable shaft sections carrying discs and each disposed between and at its ends journaled in adjacent shaft bearings; one of said end bearings and shaft sections being adapted to be substituted for the adjacent intermediate bearing and shaft section upon removal of said intermediate bearing and shaft section.

3. In a tillage implement of the character described, the combination of a frame bar, a furrow wheel bracket adjustable to different positions lengthwise of said frame bar, a journal bearing on said bracket, a furrow wheel shaft journaled in said bearing, a furrow wheel on said shaft, end and intermediate brackets carried by said frame bar, end and intermediate shaft bearings secured to the lower ends of said brackets, and a plurality of separable shaft sections, each disposed between and at its ends journaled in adjacent shaft bearings; one end bracket and its associated end bearing and end shaft section being adapted to be substituted for the adjacent intermediate bracket and its associated shaft bearing and shaft section upon removal of said intermediate bracket, shaft bearing and shaft section.

4. A specific embodiment of claim 3, wherein the frame bar is formed with bolt holes spaced at distances corresponding to the lengths of the separable shaft sections, and the brackets carrying the shaft bearings are attached to the frame bar by bolts passed through said holes.

5. A specific embodiment of claim 3, wherein the frame bar is formed with bolt holes spaced at distances corresponding to the spacing of the discs on the shaft sections and wherein said shaft sections are capable of being lengthened or shortened by amounts corresponding to an integer or multiple of the distance between adjacent holes, and wherein the brackets carrying the shaft bearings are attached to the frame bar by bolts passed through certain of said holes.

6. In a gang disc plow, the combination of a frame bar, brackets carried by said frame bar, bearings carried by said brackets, a plurality of separable, axially aligned, multiple-disc shaft sections journaled at their ends in said bearings, and means whereby said sections are rotatably locked together.

7. In a tillage implement of the character described, an earth working member comprising a plurality of separable sections disposed end to end, each of said sections comprising a plurality of centrally apertured discs, centrally apertured spacing sleeves between said discs, centrally apertured clamps engaging the outer sides of the end discs of the series, axially bored trunnions integral with said clamps, the trunnions at adjacent ends of adjacent sections being adapted to interfit, and a clamping bolt extending through the apertures of said discs, sleeves and clamps, and the bore of one of said trunnions and rigidly uniting said discs, sleeves and clamps.

JOSEPH E. BODA.